United States Patent
Kozlov et al.

(10) Patent No.: US 12,488,125 B2
(45) Date of Patent: Dec. 2, 2025

(54) ALIAS DIRECTORY

(71) Applicant: Visa International Service Association, San Francisco, CA (US)

(72) Inventors: Evgeny Kozlov, Dubai (AE); Srinivas Vadhri, San Ramon, CA (US); Alexey Oreshin, Singapore (SG); Swapnil Vasant Mhasde, Singapore (SG); Vadim Grevtsov, Dubai (AE); Harsha Sathyanarayana Naga, Dubai (AE)

(73) Assignee: Visa International Service Association, San Francisco, CA (US)

( * ) Notice: Subject to any disclaimer, the term of this patent is extended or adjusted under 35 U.S.C. 154(b) by 295 days.

(21) Appl. No.: 18/043,010

(22) PCT Filed: Sep. 17, 2021

(86) PCT No.: PCT/US2021/050982
§ 371 (c)(1),
(2) Date: Feb. 24, 2023

(87) PCT Pub. No.: WO2022/061182
PCT Pub. Date: Mar. 24, 2022

(65) Prior Publication Data
US 2023/0325520 A1    Oct. 12, 2023

Related U.S. Application Data

(60) Provisional application No. 63/081,259, filed on Sep. 21, 2020, provisional application No. 63/129,459, filed on Dec. 22, 2020.

(51) Int. Cl.
*G06F 21/00*    (2013.01)
*G06F 21/33*    (2013.01)
*G06F 21/62*    (2013.01)

(52) U.S. Cl.
CPC .......... *G06F 21/6218* (2013.01); *G06F 21/33* (2013.01); *G06F 2221/2151* (2013.01)

(58) Field of Classification Search
CPC ................. G06F 21/33; G06F 21/6218; G06F 2221/2151; G06Q 20/0855; G06Q 20/227; G06Q 20/385
See application file for complete search history.

(56) References Cited

U.S. PATENT DOCUMENTS

| | | |
|---|---|---|
| 8,156,543 B2 | 4/2012 | Wentker et al. |
| 10,382,445 B1 | 8/2019 | Mantel et al. |

(Continued)

FOREIGN PATENT DOCUMENTS

WO    2001/035355 A1    5/2001

OTHER PUBLICATIONS

PCT/US2021/050982, "International Search Report and Written Opinion", Dec. 31, 2021, 11 pages.

(Continued)

*Primary Examiner* — Joseph P Hirl
*Assistant Examiner* — Chi D Nguy
(74) *Attorney, Agent, or Firm* — Kilpatrick Townsend & Stockton LLP

(57) ABSTRACT

A method is disclosed and includes receiving an alias resolve request message comprising an alias from a transfer server, and then transmitting the alias resolve request message comprising the alias to plurality of mapping computers. Then, a plurality of alias resolve response messages are received from the plurality of mapping computers, the plurality of alias resolve response messages respectively comprising a plurality of credentials or tokens. A credential or token from the plurality of credentials or tokens is then determined and transmitted to transfer server computer. The (Continued)

transfer server computer conducts a transaction process using the determined credential or token.

20 Claims, 7 Drawing Sheets

(56) References Cited

U.S. PATENT DOCUMENTS

| | | |
|---|---|---|
| 2009/0182654 A1 | 7/2009 | Mullen et al. |
| 2015/0106239 A1 | 4/2015 | Gaddam et al. |
| 2016/0321625 A1 | 11/2016 | Gilliam, III et al. |
| 2017/0364910 A1* | 12/2017 | Malhotra .............. G06Q 20/027 |
| 2018/0053182 A1* | 2/2018 | Mokhasi ................ H04L 63/126 |
| 2018/0232645 A1 | 8/2018 | Finkelstein et al. |
| 2019/0149511 A1 | 5/2019 | Dias et al. |
| 2019/0222422 A1 | 7/2019 | Purves |
| 2019/0340590 A1* | 11/2019 | Davey .................. G06Q 20/108 |

OTHER PUBLICATIONS

EP2021870336.1 , "Extended European Search Report", Feb. 7, 2024, 7 pages.

* cited by examiner

ALIAS DIRECTORY

CROSS-REFERENCE TO RELATED APPLICATIONS

This application is a National Stage of International Application No. PCT/US2021/050982, filed on Sep. 17, 2021, which claims priority to U.S. Provisional Application No. 63/081,259, filed on Sep. 21, 2020, and U.S. Provisional Application No. 63/129,459, filed on Dec. 22, 2020, which are herein incorporated by reference in their entirety.

BACKGROUND

Access interactions such as interactions to access secure data, secure locations, or resources such as goods and services can present many data security challenges. For example, such interactions can require the use of some sort of confidential access data such as a password, secret, or account number. If the confidential access credential is compromised, then an unauthorized party such as a hacker or thief, could perform a number of illegitimate interactions.

Another issue that is associated with confidential access data is that is can be difficult for a user to remember and provide when needed. For example, an account identifier could be over ten digits long, and could be mix of alphanumeric characters. Confidential access data such as this can be difficult for a user to remember, and it may be that the user is unable to remember it when they need to conduct an interaction.

More efficient ways to address these problems, especially in the context of a distributed network, are needed.

Embodiments of the invention address this and other problems, both individually and collectively.

SUMMARY

One embodiment of the invention can include a method comprising: receiving, by a directory server computer, an alias resolve request message comprising an alias from a transfer server computer; transmitting, by the directory server computer, the alias resolve request message comprising the alias to plurality of mapping computers; receiving, by the directory server computer, a plurality of alias resolve response messages from the plurality of mapping computers, the plurality of alias resolve response messages respectively comprising a plurality of credentials or tokens; determining, by the directory server computer, a credential or token from the plurality of credentials or tokens in the plurality of alias resolve response messages; and transmitting, by the directory server computer, the determined credential or token to the transfer server computer, wherein the transfer server computer conducts a transaction process using the determined credential or token.

Another embodiment of the invention can include directory server comprising: a processor; and a non-transitory computer readable medium comprising code, executable by the processor for performing operations including: receiving an alias resolve request message comprising an alias from a transfer server computer; transmitting the alias resolve request message comprising the alias to plurality of mapping computers; receiving a plurality of alias resolve response messages from the plurality of mapping computers, the plurality of alias resolve response messages respectively comprising a plurality of credentials or tokens; determining a credential or token from the plurality of credentials or tokens in the plurality of alias resolve response messages; and transmitting the determined credential or token to the transfer server computer, wherein the transfer server computer conducts a transaction process using the determined credential or token.

Another embodiment includes a method comprising: receiving, by a first transfer server from a sender device, an alias, transmitting, by the first transfer server, an alias resolve request message comprising the alias to a directory server computer, wherein the directory server computer transmits the alias resolve request message comprising the alias to plurality of mapping computers, receives a plurality of alias resolve response messages from the plurality of mapping computers, the plurality of alias resolve response messages respectively comprising a plurality of credentials or tokens, determines a credential or a token from the plurality of credentials or tokens, and transmits the determined credential or token to the transfer server computer; receiving, by the first transfer server from the directory server computer, the credential or the token; generating, by the first transfer server, an interaction message comprising the credential or the token; and transmitting, by the first transfer server, the interaction message to a second transfer server to perform an interaction.

These and other embodiments are described in further detail below.

BRIEF DESCRIPTION OF THE DRAWINGS

FIG. 3 shows a block diagram of a processing computer according to an.

DETAILED DESCRIPTION

Figure 1:
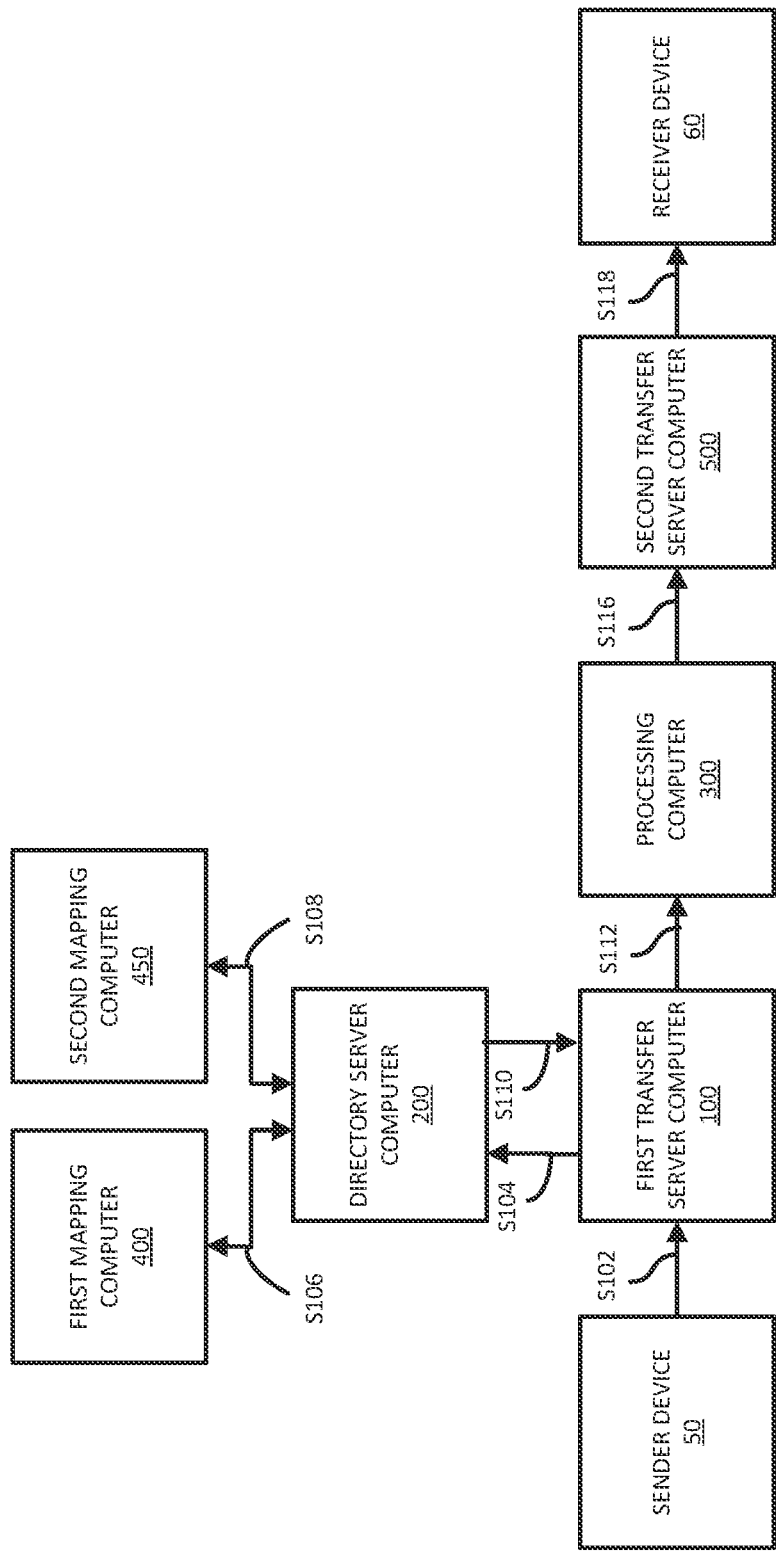
FIG. 1 shows a block diagram of an exemplary system according to embodiments along with an overlaid process flow.

Prior to discussing the details of some embodiments of the present disclosure, description of some terms may be helpful in understanding the various embodiments.

A "user" may include an individual or a computational device. In some embodiments, a user may be associated with one or more personal accounts and/or mobile devices. In some embodiments, the user may be a cardholder, account holder, or consumer.

A "user device" may be any suitable device that can be used by a user. A "user device" may be in any suitable form. Some examples of user devices include cards (e.g., debit, credit, and prepaid cards) with magnetic stripes or contactless elements (e.g., including contactless chips and antennas), fobs, wearable devices, mobile phones, tablet computers, etc. A user device that is operated by a receiver may be referred to as a receiver device, while a user device operated by a sender may be referred to as a sender device. In some embodiments, a user device may be a communication device.

A "communication device" (sometimes referred to as a mobile communication device or mobile device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

A "resource provider" can be an entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose. Examples of applications may include transit applications, secure data access applications, banking applications, digital wallet applications, etc.

An "access device" may be any suitable device for providing access to something. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

An "electronic wallet" or "digital wallet" can include an electronic device that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "interaction message" may include a message that facilitates an interaction. Examples of interaction messages include transaction messages such as authorization request messages, authorization response messages, data access request messages, location access request messages, push transaction messages such as OCT messages, etc.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, an authorization response message is generated by an issuing financial institution or a payment processing network. The authorization response message may include, by way of example only, one or more of the following status indicators: Approval—transaction was approved; Decline—transaction was not approved; or Call Center—response pending more information, merchant can call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "server computer" is typically a powerful computer or cluster of computers. For example, the server computer can be a large mainframe, a minicomputer cluster, or a group of servers functioning as a unit. In one example, the server computer may be a database server coupled to a Web server.

Details of some embodiments of the present disclosure will now be described in greater detail.

Aliases can be used to protect confidential access data and can be used to provide the user with an easily way to access the confidential access data. However, in some instances, many different entities (e.g., social network servers, financial institutions such as banks, wallet providers, data access computers, etc.) can maintain mappings of aliases to confidential access data. The user may also map a single alias (e.g., a phone number) to different credentials (e.g., different credit or debit card account numbers) for different entities. For example, a user may map the user's phone number to the user's credit card number in a database associated with the user's digital wallet. The user may also map the user's phone number to a debit card number in a merchant database at a particular merchant server. If a user interacts with a number of different entities, then these different mapping databases can be numerous. It would be desirable to allow a user to access any of those pre-existing mapping databases to efficiently conduct interactions. For instance, if the user has tied a particular alias to five different credentials at five different entities, then it would be desirable if the user could access any of the five credentials to efficiently conduct a current interaction. This can also be useful in the instance where one of the mapping computers is non-responsive or slow to respond to a request for a credential or token. Other mapping computers can respond with stored credentials or tokens more quickly, thereby preventing any processing delays.

Embodiments of the invention can include a method. The method can include receiving, by a directory server computer, an alias resolve request message comprising an alias from a transfer server. The transfer server computer can be a first transfer server and can receive a message with an alias from a sender device at the start of an interaction such as a payment transaction. The transfer server computer (e.g., a first transfer server computer, a second transfer server computer, etc.) can be a transport computer such as an acquirer computer, an authorizing entity computer such as an issuer computer, a digital wallet server, a payment server, a resource provider server (e.g., a merchant server), a social network server, etc.

After receiving the alias resolve request message, the directory server computer can then transmit the alias resolve request message comprising the alias to plurality of mapping computers (e.g., in parallel or substantially in parallel). After receiving the alias resolve request messages, the mapping computers may search their databases to identify any credentials or tokens associated with the alias. The mapping computers can then return the credentials or the tokens to the transfer server computer in alias resolve response messages.

A credential or token from the plurality of credentials or tokens is then determined (e.g., selected) by the directory server computer, and is then transmitted to the transfer server computer. The transfer server computer then conducts a transaction process using the determined credential or token. In some embodiments, the transfer server computer generates a push transaction message, such as an OCT message comprising the credential or token, and a transfer amount, and then transmits the push transaction message to a second transfer server computer for further processing of the push transaction. A push transaction message is an example of an interaction message. Another example of an interaction message may include an authorization request message.

FIG. 1 shows an exemplary system according to embodiments of the invention. FIG. 1 shows a system comprising a sender device 50 operated by a sender that interacts with a first transfer server computer 100. The first transfer server computer 100 is in communication with a directory server computer 200. The directory server computer 200 may communicate with the first transfer server computer 100, and/or the first and second mapping computers 400, 450 via one or more APIs (e.g., a RESOLVE API). Although two mapping computers 400, 450 are illustrated, any number of mapping computers can be present in embodiments of the invention.

The first transfer server computer 100 is also in communication with a second transfer server computer 500 via a processing computer 300. The second transfer server computer 500 can communicate with a receiver device 60 operated by a receiver.

The first and second mapping computers 400, 450 may or may not be affiliated with the first and second transfer server computers 100, 500. For example, the first mapping computer 400 may be operated by the same entity as the first transfer server computer 100, and the second mapping computer 450 may be operated by an entity that has no formal affiliation with the entities that operate the first and second transfer server computers 100, 500.

The receiver device 60 and the sender device 50 are examples of user devices. In some embodiments, the receiver device 60 and the sender device 50 may each contain applications that are associated with the first transfer server computer 100 and the second transfer server computer 500, respectively. For example, the sender device 50 may have a first application, which may be a social network application and the first transfer application server computer 100 can be a social network server computer operating the social network application. The second transfer server computer 500 could be a digital wallet server computer, and the receiver device 60 may have a second application, which may be a digital wallet application.

The components in the system of FIG. 1 and any of the following figures can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); and Secure Hypertext Transfer Protocol (HTTPS).

In the method of FIG. 1, a sender (an example of a first user) operating the sender device 50 (an example of a first user device) wishes to conduct an interaction with a receiver (an example of a second user) operating the receiver device 60 (an example of a second user device). For example, the sender may wish to pay the receiver a predetermined amount of money. In another example, the sender may wish to send sensitive data such as a confidential message to the receiver of the receiver device 60.

In embodiments of the invention, the sender of the sender device 50 can obtain the alias of the receiver prior to initiating the interaction. In some embodiments, the sender may obtain the alias of the receiver directly from the receiver. For example, the receiver may use the receiver device 60 to transmit the alias of the receiver to the sender device 50. In other embodiments, the sender may obtain the alias of the receiver by contacting the second transfer server computer 500 and looking up the alias of the receiver operating the receiver device 60.

In step S102, the sender device 50 can generate and send an interaction request such as a payment request to the first transfer server computer 100. The interaction request may include data including an amount and an alias of the receiver. The amount may be an amount of funds that the sender wishes to send to the receiver. The interaction request may additionally comprise an alias of the sender, or a credential or token associated with the sender.

In step S104, the first transfer server computer 100 can receive the interaction request, and can then generate an alias resolve request message comprising the alias of the receiver. In some embodiments, the alias resolve request message may also include an alias of the sender.

After the directory server computer 200 receives the alias resolve request message comprising at least the alias of the receiver, the directory server computer 200 can look up the addresses (e.g., server addresses) of the various mapping computers associated with the alias of the receiver. The receiver of the receiver device 60 may have previously registered the alias of the receiver along with the identities and addresses of the various mapping computers 400, 450 with the directory server computer 200. The mapping computers 400, 450 store the mappings of the alias of the receiver to credentials or tokens of the receiver. While the directory server computer 200 could store some mappings of aliases to credentials or tokens in some embodiments, the directory server computer 200 does not store any credentials or tokens in preferred embodiments of the invention.

After the directory server computer 200 identifies the various mapping computers 400, 450 associated with the alias of the receiver, the directory service computer transmits the alias resolve request message to each of the first and second mapping computers 400, 450 in steps S106, S108.

After the first and second mapping computers 400, 450 receive the alias resolve request messages from the directory server computer 200, the first and second mapping computers 400, 450 can look up any credentials or tokens associated with the alias of the receiver in the respective databases associated with the mapping computers 400, 450. The first and second mapping computers 400, 450 may contain an alias-to-credential (e.g., alias-to-PAN) mapping or alias-to-token mapping. The directory server computer 200 may therefore receive multiple alias resolve response messages from the mapping computers 400, 450. The multiple alias resolve response messages may contain the same or different credential (e.g., PAN) or token of the receiver.

Once the credentials or tokens are identified using the alias, each of the first and second mapping computers 400, 450 can then generate and transmit alias resolve response messages comprising the credentials or tokens back to the directory server computer 200. In some embodiments, the alias resolve response messages may be encrypted using mutual SSL and/or message level encryption (MLE), or they may be returned via one or more secure APIs. In some embodiments, the alias resolve response messages may be FETCH API responses.

In some embodiments, the alias resolve response messages may also indicate the type of access data that is being returned. For example, the alias resolve response message may comprise data indicating whether the access data being returned is a token or a real credential such as a primary account number or PAN, or data indicating the type of credential or token that is being sent. In the latter case, the data indicating the type of credential or token that is being sent may indicate that the credential being returned is a credit card number as opposed to a debit card number. In some embodiments, the alias resolve response messages may also include other data associated with the receiver that is stored in conjunction with the alias of the receiver. For example, the data associated with the receiver could include information such as the name and/or address of the receiver, any processing preferences associated with the receiver, any timestamps associated with the association of the alias, and the token or credential, etc.

After the directory service computer 200 receives the plurality of alias resolve response messages respectively comprising the plurality of credentials or tokens from the first mapping computer 400 and the second mapping computer 450, the directory service computer 200 can determine a credential or token from the received plurality of credentials or tokens.

The directory server computer 200 can determine the credential or token in a number of different ways. In one example, the directory server computer 200 can compare receipt times associated with the alias resolve response messages in the plurality of alias resolve response messages, and then select the alias resolve response message with the earliest receipt time. For example, if the directory server computer 200 receives a plurality of credentials in alias resolve response messages from the first mapping computer 400 and the second mapping computer 450, respectively, the directory server computer 200 may evaluate which of the alias resolve response messages is received first. The directory server computer 200 can then select the credential or the token from the alias resolve response message with the earliest receipt time.

In another example, the directory server computer 200 can determine the credential or the token by determining a preference list associated with the alias, and then determine the credential or the token using the preference list. For example, the directory server computer 200 can store a preference list of the preferred credentials that the receiver of the receiver device 60 wishes to use in interactions. For example, the receiver may indicate to the directory server computer 200 a preference to use a credential stored in the second mapping computer 450 over a credential stored in the first mapping computer 440. Thus, if credentials are received from the first mapping computer 400 and the second mapping computer 450 with an acceptable predetermined time period, then the directory server computer 200 will select the credential from the second mapping computer 450 to complete the interaction.

In another example, each of the alias resolve response messages may contain timestamps which indicate when the credential (e.g., PAN) or token was associated with the alias by the corresponding mapping computer. The timestamps may be used by the directory server computer 200 to determine a credential or a token. For example, a first credential was associated with an alias in the first mapping computer 400 on Jan. 1, 2021 at 12:00 am, and a second credential was associated with the alias in the second mapping computer 450 on Jan. 2, 2021 at 12:00 am. The alias resolve response messages contain timestamps according to these dates along with the credentials corresponding to the alias. The directory server computer 200 can select the credential associated with the earliest timestamp.

In step S110, after determining the credential or token, the directory server computer 200 transmits the credential or the token associated with the receiver to the first transfer server computer 100.

The description above provides details on how an alias of a receiver is resolved to a credential or a token. However, as noted above, in some embodiments, the alias resolve request message may also include an alias of the sender. A similar process can be performed to resolve the alias of the sender to a corresponding credential or token.

After receiving the credential or the token, the first transfer server computer 110 can conduct a transaction process using the credential or the token. For example, the first transfer server computer 110 can generate a push transfer message comprising the credential or the token. In some embodiments, the push transfer message may be an original credit transaction (OCT) message. The OCT message may comprise the credential or the token, and the amount. An OCT (Original Credit Transaction) can be a clearing and settlement credit transaction designed for use in business applications such as a business money transfer or business-to-consumer repayments. The OCT can be a transaction used to deliver funds to the receiver account. It is separate from, and can take place after, an AFT transaction in some cases. Further details on the OCT messages can be found in U.S. Pat. Nos. 8,851,366 and 10,402,815, which are incorporated by reference in their entirety.

In step S112, the first transfer server computer 100 can transmit the push transfer message to the processing computer 300. In step S116, after receiving the push transfer message, the processing computer 300 can transmit the push transfer message to the second transfer server computer 500. After receiving the push transfer message, the second transfer server computer 500 can credit an account of the receiver operation the receiver device 60 for the amount in the push transfer message. The account can be tied to the credential or the token received in the push transfer message. For example, the credential can be a credit card number in the push transfer message, and the account can be a credit card account maintained by the second transfer server computer. The credit card account can be credited for the amount in the push transaction message.

Figure 6:
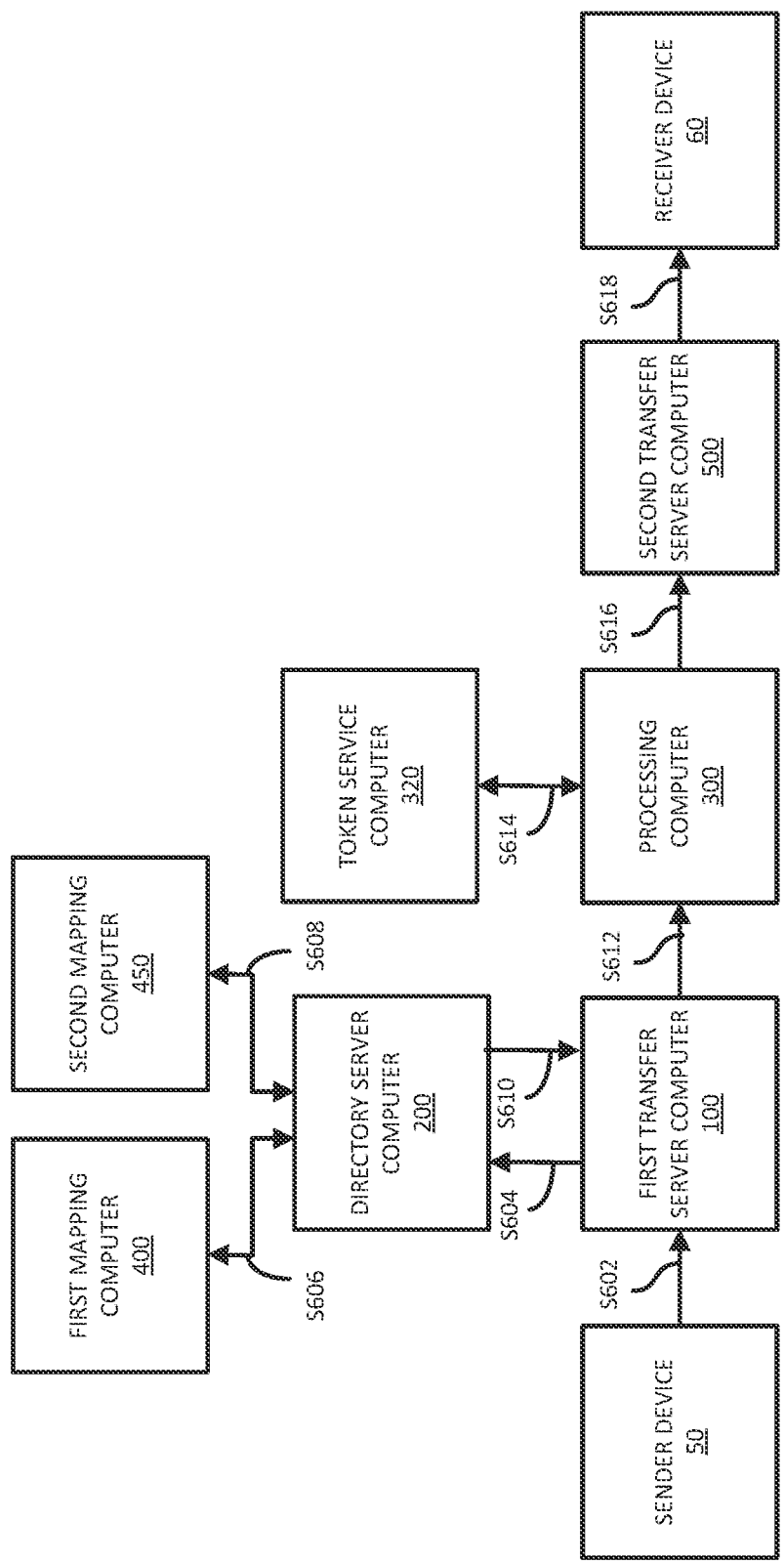
FIG. 6 shows a block diagram of another exemplary system according to embodiments along with another overlaid process flow.

If the push transaction message contains a token instead of a credential, then the second transfer computer 500 or any other computer may resolve the token to the corresponding credential before crediting the receiver's account. FIG. 6 shows a more detailed example of such embodiments.

In step S118, the second transfer server computer 500 can send a message to the receiver device 60 indicating that the interaction was processed. For example, the second transfer server computer 500 can inform the receiver operating the receiver device 60 that the receiver's account has been debited for an amount of the interaction.

At the end of the day or at any other suitable period of time, a clearing and settlement process can occur between the first transfer server computer 100, the processing computer 300, and the receiver device 60, whereby actual funds are transferred from an account associated with the sender (e.g., maintained by the first transfer server computer 100) to an account associated with the receiver (e.g., maintained by the second transfer server computer 500).

Figure 2:
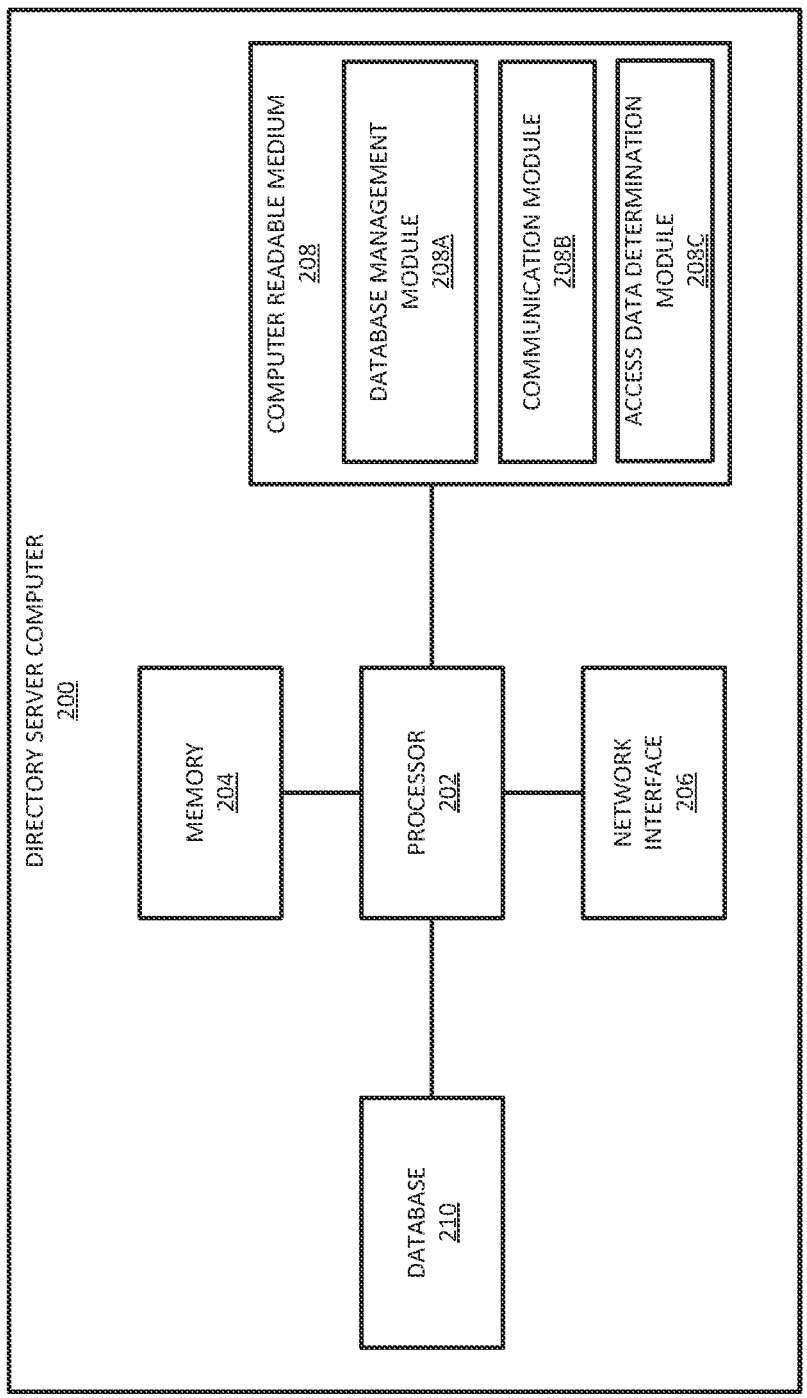
FIG. 2 shows a block diagram of a directory server computer according to an embodiment.

FIG. 2 shows a block diagram of a directory server computer 200 according to embodiments. The directory server computer 200 may comprise a processor 202. The processor 202 may be coupled to a memory 204, a network interface 206, and a computer readable medium 208, and a database 210.

The computer readable medium 208 may comprise any suitable number and types of software modules. Examples of software modules include a database management module 208A, a communication module 208B, and an access data determination module 208C. The database management module 208A and the processor 202 can retrieve or store data (e.g., aliases, tokens, credentials, etc.) in the database 210. The communication module 208B and the processor 202 can allow the directory server computer 200 to communicate with various external entities. The access data determination module 208C and the processor 202 can determine which of the various credentials or tokens that are received from external mapping computers to select. Descriptions of such selection processes are provided above.

The computer readable medium 208 can comprises code, executable by the processor for performing operations including: receiving an alias resolve request message comprising an alias from a transfer server; transmitting the alias resolve request message comprising the alias to plurality of mapping computers; receiving a plurality of alias resolve response messages from the plurality of mapping computers, the plurality of alias resolve response messages respectively comprising a plurality of credentials or tokens; determining a credential or token from the plurality of credentials or tokens in the plurality of received alias resolve response messages; and transmitting the determined credential or token to the transfer server computer, wherein the transfer server computer conducts a transaction process using the determined credential or token.

The memory 204 can be used to store data may comprise any combination of volatile and/or non-volatile memory such as RAM, DRAM, ROM, flash, or any other suitable memory device.

The database 210 may comprise a directory of mapping computer addresses (e.g., IP addresses) and aliases associated with each of the addresses. The database 210 may also store data received from the mapping computers in the system.

The network interface 206 may include an interface that can allow the digital tag computer 200 to communicate with external computers. The network interface 206 may include an interface that can allow the user device 200 to communicate with external computers. The network interface 206 may enable the user device 200 to communicate data to and from another device such as transfer server computers and mapping computers. Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The directory server computer 200 may contain a number of APIs (e.g., programmed in the computer readable medium 208) associated with external linkages to the directory server computer 200. Examples of such APIs are below A "Resolve API" associated with the directory server computer 200 can resolve an alias to a credential such as a consumer PAN or a merchant PAN, and associated data such as a common identifier for associated with the credential (e.g., a merchant name).

A "CreateAlias API" can create/add an alias to a credential such as a user PAN or token, along with user data including user consent data and time stamp data as to when the alias to credential or token associated was created, in the database 210. Authorizing entities such as issuers can be required to provide a unique identifier (i.e. GUID) to identify their users during the alias creation process.

A "GetAlias API" can be used to retrieve the alias and related data (e.g., PAN, name, city, country) from the directory server computer 200. For example, an authorizing entity such as an issuer can retrieve and display data in a mobile/web application for alias lifecycle management.

An "UpdateAlias API" can update the alias-to-credential or token mapping in scenarios such as linking a new card to an existing alias due to a lost card or linking a new credential such as a new PAN due to an expiring card. An authorizing entity such as an issuer may also use this API to update user data such as city and state, or capture consent data and a time when the user enrolls in the alias program.

A "DeleteAlias API" can be used to delete an alias associated with a credential such as a user PAN from the directory service computer 200.

In some embodiments, the database 210 may contain data in key data fields, to be used by an originator to create a transaction.

Figure 7:
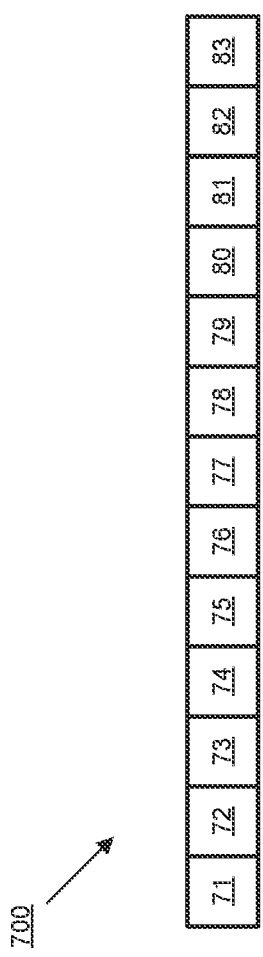
FIG. 7 shows a collection of data field according to embodiments.

FIG. 7 shows an example of a collection of data fields for a consumer alias data structure that can be present in the directory server computer 200. The data fields can include: a format version 71, such as a directory server computer batch file version; a GUID (global unique identifier) 72 generated by an issuer to uniquely identify a user; a new GUID 73; a name associated with the user 74; location data such as city, country, and postal code 75; a PAN (primary account number) or other credential associated with the user 76; the name of the issuer 77; a card type 78; an alias associated with the consumer 79; the type of the alias 80; a stamp of consent including the date and time, essential for the mapping to be activated 81; a primary flag which indicates that the mapping may be used in alias resolution 82; and a state which may be "active", "inactive", or "disabled" 83. An "active" state indicates the mapping with consent time stamp is recorded in the directory server computer, and only "active" mappings are used to resolve an alias to a PAN. An "inactive" state indicates the mapping does not have a consent time stamp record in the directory server computer, and may be activated by the user upon providing consent. A "disabled" state may indicate the user has chosen to opt-out, in which case the time of opt-out is recorded in the directory server computer, the account has closed, associated another PAN with the existing alias. An issuer can be informed when the mapping is set to "disabled" for a user.

In another example, if the receiver is a merchant and the credential is a PAN, then the directory server computer 200 can contain alias-to-merchant PAN data fields pursuant to a defined format. The data fields, which could be included by an acquirer during a registration may include: a format version, such as a directory server computer batch file version; an AliasID generated by the acquirer to uniquely identify a merchant point of sale (POS); a merchant PAN; an acquirer BID; the name of the merchant; a merchant category code (MCC); a payload format; the point of initiation method; a currency code; a tip/convenience fee; fee amount; location data such as city, country, and postal code; contact info such as email, and phone number; and a state which may be "active" or "disabled". Only "active" mappings are used to resolve an alias. A "disabled" status indicates that the acquirer has terminated merchant acceptance. Note that the data fields could be populated before a transaction is initiated, or after it is initiated.

Figure 3:
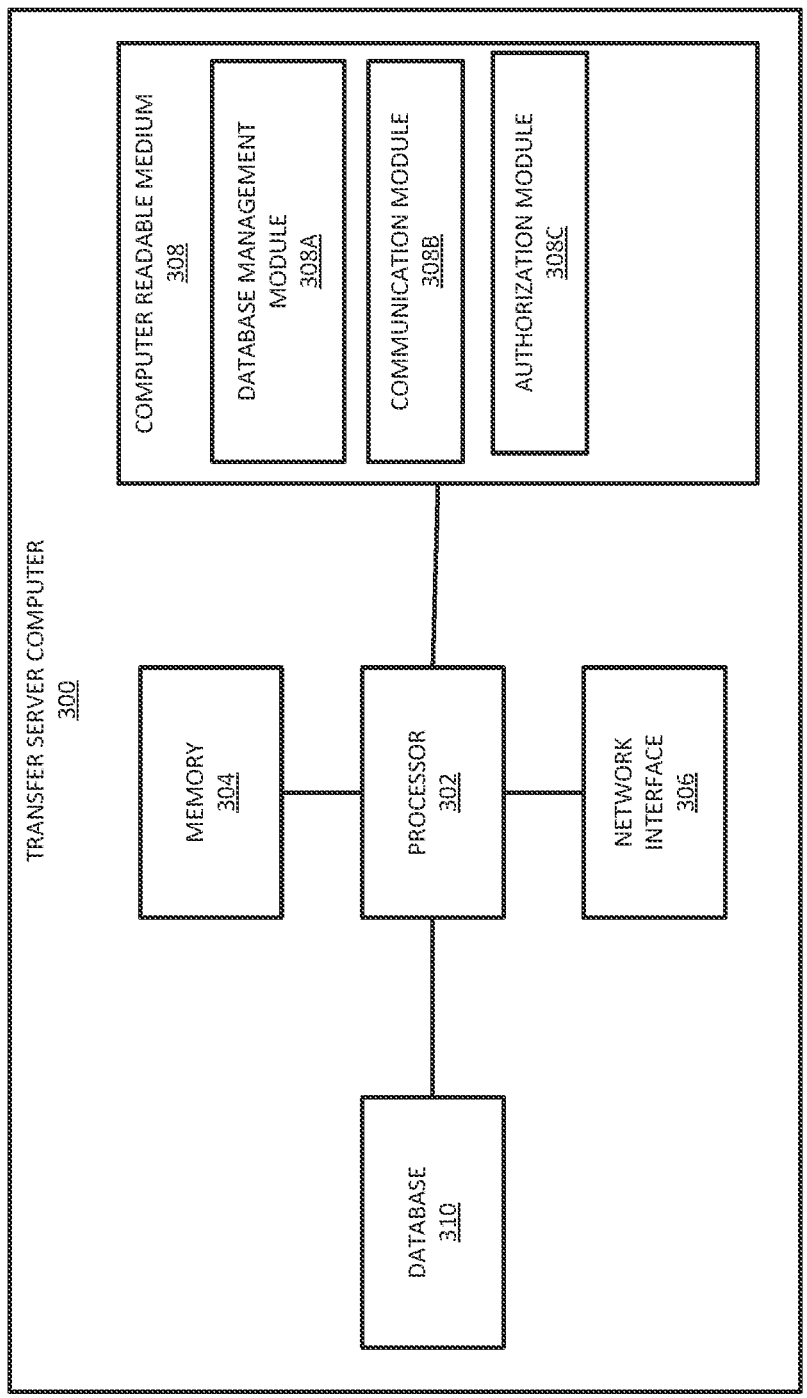

FIG. 3 shows a block diagram of a transfer server computer 300 according to embodiments. The transfer server computer 300 may comprise a processor 302. The processor 302 may be coupled to a memory 304, a network interface 306, and a computer readable medium 308, and a database 310. The transfer computer 300 may be similar to the first transfer server computer 100 or the second transfer server computer 500 in FIG. 1.

The computer readable medium 308 may comprise any suitable number and types of software modules. Examples of software modules include a database management module 308A, a communication module 308B, and an authorization module 308C. The database management module 308A and the processor 302 can retrieve or store data (e.g., tokens, credentials, etc.) in the database 310. The communication module 308B and the processor 302 can allow the transfer server computer 300 to communicate with various external entities (e.g., mapping computers, user devices with applications, directory server computers. etc). The authorization module 308C and the processor 302 can process transaction request and response messages, and can route them to and from their intended destinations.

The computer readable medium 308 may comprise code, executable by the processor 302 to perform operations including receiving an alias; transmitting an alias resolve request message comprising the alias to a directory server computer, wherein the directory server computer transmits the alias resolve request message comprising the alias to each of a plurality of mapping computers, receives a plurality of alias resolve response messages from the plurality of mapping computers, the plurality of alias resolve response messages respectively comprising a plurality of credentials or tokens, determines a credential or a token from the plurality of credentials or tokens, and transmits the determined credential or token to the transfer server computer; receiving, from the directory server computer, the credential or the token; generating, by the first transfer server, an interaction message comprising the credential or the token; and transmitting the interaction message to a second transfer server to perform an interaction.

The database 310 may comprise aliases, and accounts associated with users (e.g., senders and receivers).

The memory 304 and the network interface 306 may have the same or different characteristics as the memory 204 and the network interface 206 in FIG. 2.

Figure 4:
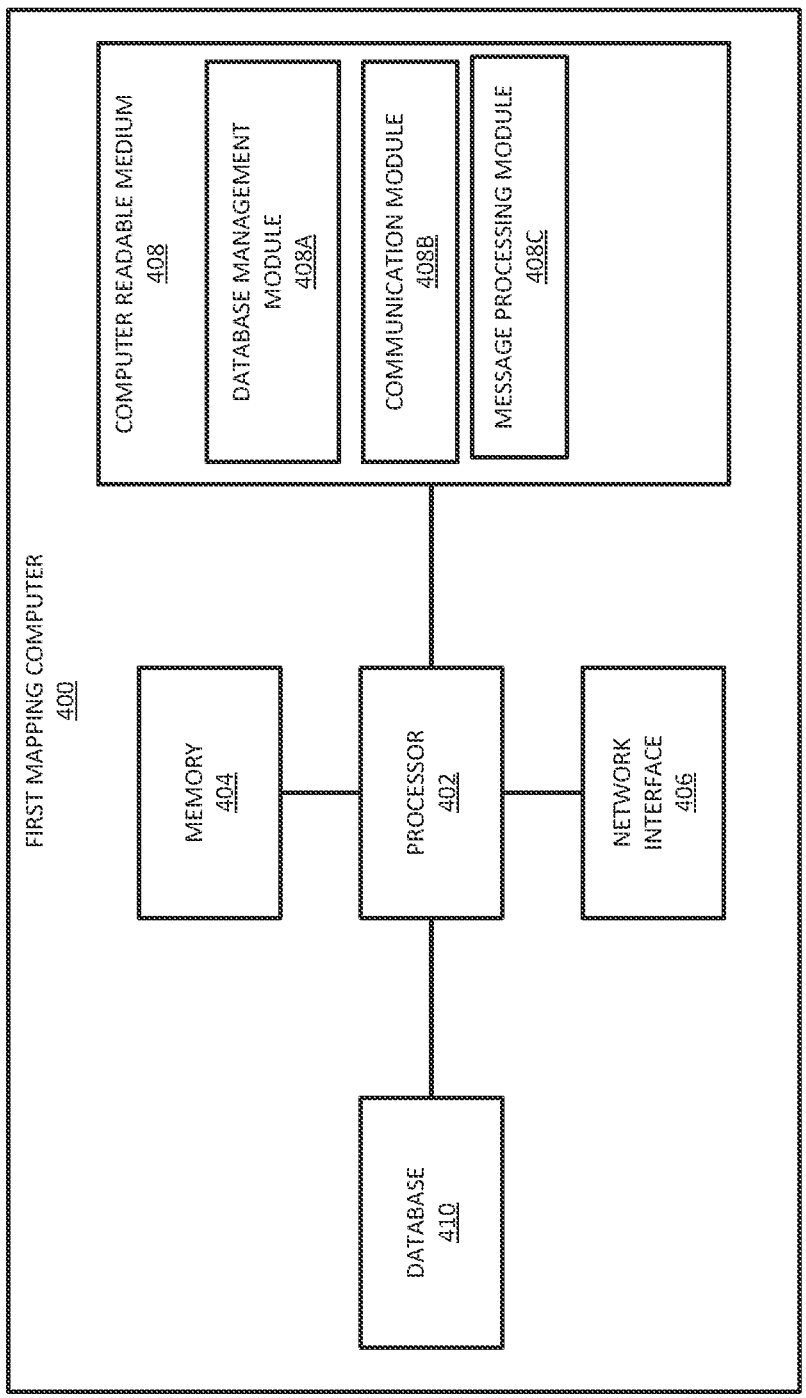
FIG. 4 shows a block diagram of a mapping computer according to an embodiment.

FIG. 4 shows a block diagram of a first mapping computer 400 according to embodiments. The features of the first mapping computer 400 can be similarly present in any other mapping computer (e.g., the second mapping computer 450). The first mapping computer 400 may comprise a processor 402. The processor 402 may be coupled to a memory 404, a network interface 406, and a computer readable medium 408, and a database 410.

The computer readable medium 408 may comprise any suitable number and types of software modules. Examples of software modules include a database management module 408A, a communication module 408B, and a message processing module 408C. The database management module 408A and the processor 402 can retrieve or store data (e.g., aliases, tokens, credentials, etc.) in the database 410. The communication module 408B and the processor 402 can allow the first mapping computer 400 to communicate with various external entities. The message processing module 408C and the processor 402 can process received alias resolve request messages, and generate and transmit alias resolve response messages as described herein.

The memory 404 can be used to store data that may comprise any combination of volatile and/or non-volatile memory such as RAM, DRAM, ROM, flash, or any other suitable memory device.

The database 410 may store aliases and corresponding tokens or credentials, as well as other data. Such other data may include data about the user or the user device associated with the aliases. For example, the database 410 may include a table with a row, which includes an alias, a user's personal information for the user of the alias, and any credentials or tokens associated with the alias.

The memory 404 and the network interface 406 may have the same or different characteristics as the memory 204 and the network interface 206 in FIG. 2.

Figure 5:
FIG. 5 shows another system for interacting with a token service computer.

In some embodiments, a token may be used to process an interaction. FIG. 5 illustrates a process for performing a token registration process. FIG. 5 shows a receiver device 60 in communication with a second mapping computer 450. The second mapping computer 450 may communicate with a token service computer 320. The second mapping computer 450 is shown for purposes of illustration and the methods can apply to any mapping computer in the system.

In step S502, the receiver, operating the receiver device 60 can provide consent to the second mapping computer 450 to allow the directory server computer to use the receiver's alias when processing interactions. The receiver may also provide any preferences for any tokens or credentials that are to be used in processing interactions with the alias.

After receiving the consent and the alias, the second mapping computer 450 can then verify that the receiver's alias is not taken by another user, and can verify that the credential that is to be linked to the alias is legitimate. In some embodiments, the second mapping computer 450 may verify that the credential is legitimate by sending an authentication request to the receiver. The second mapping computer 450 can then store the alias to credential association in a database along with a time stamp.

In step S504, the second mapping computer 450 may transmit the credential to the token service computer 320, and the token service computer 320 may obtain a token corresponding to the credential.

In step S506, the second mapping computer 450 receives the token from the token service computer 320 and stores the token along with the alias, and optionally the credential. In some embodiments, the second mapping computer 450 deletes the credential after receiving the token. In this case, the second mapping computer 450 would not hold sensitive information that could be obtained by a hacker.

The second mapping computer 450 may further be configured to update the alias-to-token mappings if a user wishes to update either the stored alias or the PAN associated with the corresponding stored token. In order to update the alias, the second mapping computer 450 may complete another verification process for the new alias. For example, if the user wishes to update the alias to a new phone number, the second mapping computer 450 can perform verification by sending an OTP code via SMS to a mobile phone of the user associated with the new phone number. In order to update the PAN associated with the corresponding token, the second mapping computer 450 may verify the new PAN using an authentication process such as a 3DS verification and then transmit another token provisioning request comprising the new PAN to the token service computer 320. The second mapping computer 450 may additionally generate and/or store a new timestamp for every instance in which the alias is updated or a new token is provisioned for an updated PAN.

FIG. 6 shows a method of performing an interaction where a token is returned to a first transfer server computer 100 by a directory server computer 200 instead of a credential. The system architecture in FIG. 6 is similar to the architecture in FIG. 1, except that a token service computer 320 in communication with the processing computer 300. In some embodiments, the token service computer 320 could be part of the processing computer 300.

In the method of FIG. 6, a sender operating the sender device 50 wishes to conduct an interaction with a receiver operating the receiver device 60. For example, the sender may wish to pay the receiver a predetermined amount of money. In another example, the sender may wish to send sensitive data such as a confidential message to the receiver of the receiver device 60.

The sender of the sender device 50 can obtain the alias of the receiver prior to initiating the interaction. In some embodiments, the sender may obtain the alias of the receiver directly from the receiver. In other embodiments, the sender may obtain the alias of the receiver by contacting the second transfer server computer and looking up the alias of the receiver operating the receiver device 60.

In step S602, a sender device 50 can generate and send an interaction request such as a payment request to the first transfer server computer 100. The interaction request may include data including an amount and an alias of the receiver. The amount may be an amount of funds that the sender wishes to send to the receiver. The payment request may additionally comprise an alias of the sender, or a credential or token associated with the sender.

In step S604, the first transfer server computer 100 can receive the interaction request, and then generate an alias resolve request message comprising the alias of the receiver. In some embodiments, the alias resolve request message may also include an alias of the sender.

After the directory server computer 200 receives the alias resolve request message comprising the alias of the receiver, the directory server computer 200 can look up the addresses (e.g., server addresses) of the various mapping computers associated with the alias of the receiver. The receiver of the receiver device 60 may have previously registered the alias of the receiver and the identities and addresses of the various mapping computers 400, 450, which store the mappings of the alias of the receiver to any of the various tokens mapped to the alias of the receiver.

After the directory server computer 200 identifies the various mapping computers 400, 450 associated with the alias of the receiver, the directory service computer transmits the alias resolve request message to each of the first and second mapping computers 400, 450 in steps S606, S608.

After the first and second mapping computers 400, 450 receive the alias resolve request messages from the directory server computer 200, the first and second mapping computers 400, 450 can look up any tokens associated with the alias of the receiver. Each of the first and second mapping computers 400, 450 can then generate and transmit alias resolve response messages comprising tokens back to the directory server computer 200.

After the directory service computer 200 receives the plurality of alias resolve response messages respectively comprising the plurality of tokens from the first mapping computer 400 and the second mapping computer 450, the directory service computer 200 can determine a credential or token from the received plurality of tokens.

In step S610, after determining the token, the directory server computer 200 transmits the token to the first transfer server computer 100.

After receiving the token, the first transfer server computer 100 can conduct a transaction process using the token. For example, the first transfer server computer 100 can generate a push transfer message comprising the token.

In step S612, the first transfer server computer 100 can transmit the push transfer message to the processing computer 300. In step S616, after receiving the push transfer message, the processing computer 300 can resolve the token to the credential in step S614 by communicating with the token service computer 320. Once the processing computer 300 obtains the credential associated with the token, the processing computer 300 can transmit the push transfer message with the credential to the second transfer server computer 500. After receiving the push transfer message, the second transfer server computer 500 can credit an account of the receiver operation the receiver device 60 for the amount in the push transfer message.

In step S618, the second transfer server computer 500 can send a message to the receiver device 60 indicating that the interaction was processed. For example, the second transfer server computer 500 can inform the receiver operating the receiver device 60 that the receiver's account has been debited for an amount of the interaction.

At the end of the day or at any other suitable period of time, a clearing and settlement process can occur between the first transfer server computer 100, the processing computer 300, and the receiver device 60, whereby actual funds are transferred from an account associated with the sender (e.g., maintained by the first transfer server computer 100) to an account associated with the receiver (e.g., maintained by the second transfer server computer 500).

Embodiments of the invention have a number of advantages. Embodiments enable various mapping computers to store and retrieve credentials or tokens associated with an alias, and to use any of them to conduct a current interaction such as a payment transaction. As such, embodiments are convenient for a user to conduct interactions such as payment transactions. There are also no delays when conducting interactions, since credentials or tokens are received from multiple sources, and the inability of one of the sources does not impede the speed of the transaction. Further, because an alias is used to conduct interactions, a user's real credential is not exposed to unauthorized parties who may attempt to use the real credential to commit fraud. Further, in embodiments, where a token is used to conduct an interaction, there are two data elements that can obscure a user's real credential, thus improving data security.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents. For example, although many of the specific embodiments described above relate to payment transactions, embodiments of the invention can be used in other access interactions such as interactions to access data from a computer or interactions to access secure locations. Further, although the methods describe above are specifically push transactions, embodiments of the invention can also be used in pull transactions.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a directory server computer, an alias resolve request message comprising an alias from a transfer server computer;
transmitting, by the directory server computer, the alias resolve request message comprising the alias to each of a plurality of mapping computers;
receiving, by the directory server computer, a plurality of alias resolve response messages from the plurality of mapping computers, the plurality of alias resolve response messages respectively comprising a plurality of credentials or tokens;
determining, by the directory server computer, a credential or a token from the plurality of credentials or tokens in the plurality of alias resolve response messages; and
transmitting, by the directory server computer, the determined credential or token to the transfer server computer, wherein the transfer server computer conducts a transaction process using the determined credential or token,
wherein determining the credential or the token comprises:
determining, by the directory server computer, receipt times of the alias resolve response messages in the plurality of alias resolve response messages;
comparing the receipt times associated with the alias resolve response messages in the plurality of alias resolve response messages;
selecting the alias resolve response message with the earliest receipt time; and
selecting the credential or the token from the alias resolve response message with the earliest receipt time.

2. The method of claim 1, wherein the directory server computer determines the token.

3. The method of claim 1, wherein the alias is received by the transfer server computer from a sender device prior to the directory server computer receiving the alias from the transfer server computer.

4. The method of claim 1, wherein the transfer server computer is a first transfer server computer and conducts the transaction process by generating a push transaction message including the credential and transmitting the push transaction message to a second transfer server computer.

5. The method of claim 1, wherein the directory server computer determines the token, and wherein the transfer server computer is a first transfer server computer and conducts the transaction process by generating a push transaction message including the token and transmitting the push transaction message to a second transfer server computer via a processing computer, wherein the processing computer determines the credential using the token.

6. The method of claim 1, wherein the method further comprises:
determining, by the directory server computer, addresses for the plurality of mapping computers using the alias.

7. The method of claim 1, wherein the transfer server computer is a first transfer server computer and conducts the transaction process using the determined credential by generating a push transaction message including the credential and transmitting the push transaction message to a second transfer server computer, which is associated with a receiver device.

8. The method of claim 1, wherein the directory server computer determines the token, and wherein the transfer server computer is a first transfer server computer and conducts the transaction process using the determined token by generating a push transaction message including the token and transmitting the push transaction message to a second transfer server computer via a processing computer, wherein the processing computer determines the credential using the token and transmits the push transaction message with the credential to the second transfer server computer, wherein the token is a payment token and the credential is a primary account number.

9. The method of claim 1, wherein the directory server computer determines the token, and wherein the transfer server computer is a first transfer server computer and conducts the transaction process by generating a push transaction message including the token and transmitting the push transaction message to a second transfer server computer via a processing computer, wherein the processing computer determines the credential using the token and transmits the push transaction message with the credential to the second transfer server computer.

10. The method of claim 1, wherein the transfer server computer is a first transfer server computer and conducts the transaction process by generating a push transaction message including the credential and an amount, and transmitting the push transaction message to a second transfer server computer, wherein the second transfer server computer credits the amount to a receiver operating a receiver device, the receiver device storing a transfer application that communicates with the second transfer server computer.

11. The method of claim 1, wherein each of the plurality of mapping computers comprises a database comprising mappings of aliases with credentials and/or tokens associated with different users.

12. The method of claim 1 wherein the plurality of alias resolve response messages respectively comprise a plurality of tokens, the tokens being payment tokens.

13. The method of claim 1, wherein the transaction process is a payment transaction process.

14. A directory server comprising:
a processor; and
a non-transitory computer readable medium comprising code, executable by the processor for performing operations including:
receiving an alias resolve request message comprising an alias from a transfer server computer;
transmitting the alias resolve request message comprising the alias to each of a plurality of mapping computers;
receiving a plurality of alias resolve response messages from the plurality of mapping computers, the plurality of alias resolve response messages respectively comprising a plurality of credentials or tokens;
determining a credential or a token from the plurality of credentials or tokens in the plurality of alias resolve response messages; and
transmitting the determined credential or token to the transfer server computer, wherein the transfer server computer conducts a transaction process using the determined credential or token,
wherein determining the credential or the token comprises:
determining receipt times of the alias resolve response messages in the plurality of alias resolve response messages;
comparing the receipt times associated with the alias resolve response messages in the plurality of alias resolve response messages;
selecting the alias resolve response message with the earliest receipt time; and selecting the credential or the token from the alias resolve response message with the earliest receipt time.

15. A method comprising:

receiving, by a first transfer server computer from a user device, an alias;

transmitting, by the first transfer server computer, an alias resolve request message comprising the alias to a directory server computer, wherein the directory server computer is programmed to transmit the alias resolve request message comprising the alias to each of a plurality of mapping computers, receive a plurality of alias resolve response messages from the plurality of mapping computers, the plurality of alias resolve response messages respectively comprising a plurality of credentials or tokens, determine a credential or a token from the plurality of credentials or tokens, and transmit the determined credential or token to the first transfer server computer, wherein the programming to determine the credential or the token includes programming to determine receipt times of the alias resolve response messages in the plurality of alias resolve response messages, compare the receipt times associated with the alias resolve response messages in the plurality of alias resolve response messages, select the alias resolve response message with the earliest receipt time, and select the credential or the token from the alias resolve response message with the earliest receipt time;

receiving, by the first transfer server computer from the directory server computer, the credential or the token;

generating, by the first transfer server computer, an interaction message comprising the credential or the token; and transmitting, by the first transfer server computer, the interaction message to a second transfer server to perform an interaction.

16. The method of claim 15, wherein the interaction message is a push transfer request message.

17. The method of claim 15, wherein the first transfer server computer is one of an authorizing entity computer, a transport computer, or an application server computer.

18. The method of claim 15, wherein the directory server computer does not store credentials or tokens.

19. The method of claim 15, wherein the directory server computer stores a table comprising alias and mapping computer addresses.

20. The method of claim 15, wherein the first transfer server computer is an application server computer.

* * * * *